United States Patent

Hwa

[15] 3,639,278

[45] Feb. 1, 1972

[54] COMPOSITION AND METHOD FOR INHIBITING AND REMOVING SCALE USING GLYCOLIC ACID AND LIGNOSULFONIC ACID

[72] Inventor: Chih M. Hwa, Arlington Heights, Ill.
[73] Assignee: W. R. Grace & Co., New York, N.Y.
[22] Filed: Dec. 27, 1967
[21] Appl. No.: 693,770

[52] U.S. Cl..................................252/82, 21/2.7, 134/3, 134/41, 252/180, 210/58
[51] Int. Cl..........................................C02b 1/20, C02b 5/06
[58] Field of Search..................252/82, 80, 136, 146, 175, 252/387, 388, 399, 180; 21/2.7; 134/3, 41; 23/166; 210/58 S

[56] References Cited

UNITED STATES PATENTS

| | | | |
|---|---|---|---|
| 3,072,502 | 1/1963 | Alfano | 134/3 |
| 3,433,739 | 3/1969 | Newman | 210/58 |
| 3,447,965 | 6/1969 | Teumac | 134/3 X |
| 2,710,792 | 6/1955 | McDonald et al. | 134/41 X |
| 3,308,062 | 3/1967 | Gunther | 252/82 X |

Primary Examiner—John T. Goolkasian
Assistant Examiner—M. E. McCamish
Attorney—Kenneth E. Prince

[57] ABSTRACT

Alkaline earth salt scale formation from aqueous solutions of the respective salts is inhibited by maintaining glycolic acid alone or together with lignosulfonic acids in the aqueous solutions. Existing alkaline earth salt scales can be removed from surfaces by contacting the scaled surfaces with aqueous solutions of higher concentrations of the glycolic acid and the lignosulfonic acid. Both lignosulfonic acid and its water-soluble salts can be used in the composition.

8 Claims, No Drawings

COMPOSITION AND METHOD FOR INHIBITING AND REMOVING SCALE USING GLYCOLIC ACID AND LIGNOSULFONIC ACID

This invention relates to compositions and processes for inhibiting the formation of alkaline earth salt scales from aqueous solutions of these salts, particularly on heat-exchange surfaces. This invention also relates to a composition and process for removing existing alkaline earth salt scales from surfaces.

In summary, the composition of this invention for inhibiting scale formation by alkaline earth salts in aqueous systems comprises from one to 500 parts by weight of glycolic acid and from one to 10 parts by weight of lignosulfonic acid or its water-soluble salts. One process of this invention is a method of treating an aqueous system to inhibit scale formation by alkaline earth salts comprising dispersing into said aqueous system at least 1 p.p.m. of the above composition. A method of this invention for removing existing alkaline earth salt scales from surfaces comprises contacting the surfaces with an aqueous solution of the above composition. Another method of this invention for inhibiting scale formation of alkaline earth salt scales in aqueous systems comprises dispersing into said systems from 10 to 20,000 p.p.m. of glycolic acid.

The deposition of scale primarily calcium and magnesium carbonates, phosphates, sulfates and hydroxides from aqueous solutions on heat transfer surfaces is a serious industrial problem, especially in cooling water systems, cooling tower systems, industrial evaporators and boilers, and evaporators for recovering potable water from sea water, brines, brackish water, sewage and the like. These common scale-forming compositions including the hydroxides are hereinafter denoted as "alkaline earth salts." Because of their inverse solubility, these compounds tend to precipitate onto heat-exchange surfaces where they reduce heat-transfer rates and prevent proper water circulation. In cooling tower systems, where the cooling effect is achieved by evaporation of a portion of the circulating water in passing through the tower, and in boilers and evaporators, where a portion of the water is continuously removed as vapor, the problem of scale formation is further intensified by concentration.

A wide variety of techniques have been previously proposed for preventing or solving the scale-forming problem in heat-exchange systems. Mechanical scale removal techniques are expensive and often require the disassembly of heat-exchange equipment. Acids such as sulfuric, hydrochloric, and sulfamic acids can be used to remove scale, but these chemicals are hazardous and can be handled only by trained personnel. In addition, these acids are highly corrosive to metal components of heat exchangers, and very careful control of the acid feed must be maintained to avoid damage to the equipment being treated.

It is an object of this invention to provide an improved process for preventing formation of alkaline earth salt scales on heat-exchange surfaces in aqueous systems using a more effective composition. It is another object of this invention to provide a safe, less corrosive, and highly effective composition which can be used to remove existing formations of alkaline earth salt scales.

All concentrations are herein given as weight percents or parts by weight unless otherwise specified.

The composition of this invention contains from 10 to 99.8 percent of glycolic acid. The composition of this invention also contains from 0.2 to 90 percent and preferably from 1 to 20 percent of a lignosulfonic acid or water-soluble salt thereof such as sodium, potassium, ammonium salts and the like.

The composition can also contain or be used with antifoams, corrosion inhibitors, biocides, dispersion or solution aids, and the like.

In one process of this invention for inhibiting the formation of alkaline earth salt scales from aqueous solutions of these salts, at least 1 and preferably from 10 to 1,000 p.p.m. of the mixture of the glycolic acid and lignosulfonic acid are maintained in the aqueous solution. Existing alkaline earth salt scales can be rapidly removed from surfaces by contacting them with aqueous solutions of at least 0.5 percent and preferably at least 3 percent of the glycolic acid and lignosulfonic acid mixture is maintained in the solution. In both the scale-inhibiting and scale-removing processes, these two components cooperate to provide synergistic results. Scale inhibition is obtained with lesser quantities of these ingredients, and faster scale removal is obtained with the composition.

An alternative process of this invention for inhibiting the formation of alkaline earth salt scales from aqueous solutions of these salts comprises dispersing into the aqueous solutions from 10 to 20,000 p.p.m. and preferably from 100 to 4,000 p.p.m. glycolic acid.

The invention is further illustrated by the following specific but nonlimiting examples:

EXAMPLE 1

The following compositions, when maintained in cooling towers in concentrations of 200 p.p.m., completely inhibit the formation of alkaline earth salt scales from aqueous solutions circulated through the cooling tower. A typical cooling tower which can be treated with these compositions uses a makeup water having an analysis of total dissolved solids of 799 p.p.m. a methyl orange alkalinity of 78 p.p.m. (as calcium carbonate), and a calcium hardness of 514 p.p.m. (as calcium carbonate). Such a tower can be run at a pH of 7.0 to 8.0 with three cycles of concentration, and the circulated water has a Langelier Saturation Index of 1.61, indicating a tendency to deposit calcium carbonate scale without some treatment.

| Sample No. | Ingredients, weight percent |
|---|---|
| 1 | Glycolic acid 50%; Water 50%. |
| 2 | Glycolic acid 70%; Water 30%. |
| 3 | Glycolic acid 50%; Lignosulfonic acid 2%; Water 48%. |

Alkaline earth salt scales, when contacted with aqueous solutions containing 4 percent of the above compositions, are rapidly removed from heat-exchange and other surfaces. Scale removal with the combination of lignosulfonic acid and glycolic acid is far greater than with these individual acids by themselves.

Other compositions according to this invention which are effective to inhibit scale when used in concentrations of at least 1 p.p.m. and which rapidly remove existing hardness scale when used in concentrations of at least 0.5 percent are described below:

| Example No. | Ingredients, weight percent |
|---|---|
| 2 | Glycolic acid 35%; Lignosulfonic acid 10%; Water 55%. |
| 3 | Glycolic acid 40%; Lignosulfonic acid 5%; Water 55%. |
| 4 | Glycolic acid 20%; Lignosulfonic acid 2%; Water 78%. |
| 5 | Glycolic acid 65%; Sodium lignosulfonate 2%; Water 33%. |
| 6 | Glycolic acid 40%; Ammonium lignosulfonate 1%; Water 59%. |

Obviously, many modifications and variations of the invention as hereinabove set forth can be made without departing from the essence and scope thereof, and only such limitations should be applied as are indicated in the claims.

I claim:

1. A composition for inhibiting formation of alkaline earth salt scales in aqueous systems consisting essentially of:

a. from 10 to 99.8 percent of glycolic acid, and
b. from 0.2 to 90 percent by weight of lignosulfonic acid or water-soluble salts thereof.

2. A method of treating an aqueous system to inhibit scale formation by alkaline earth salts dissolved therein comprising dispersing into said aqueous system at least 1 p.p.m. of the composition of claim 1.

3. Method as defined in claim 2 wherein from 10 to 1,000 p.p.m. of the composition are dispersed into said aqueous system.

4. A method of removing alkaline earth salt scale from a surface comprising contacting the scaled surface with an aqueous solution at least 0.5 percent of the composition of claim 1.

5. Method as defined in claim 4 wherein the aqueous solution contains at least 3 percent of the descaling composition.

6. Composition as defined in claim 1 containing from 1 to 20 weight percent of ingredient (b).

7. A method of treating an aqueous system to inhibit scale formation by alkaline earth salts dissolved therein comprising maintaining in said aqueous system from 10 to 20,000 p.p.m. of glycolic acid.

8. Method as defined in claim 1 wherein from 100 to 4,000 p.p.m. of glycolic acid is maintained in said aqueous system.

* * * * *